(12) United States Patent
Hakuba

(10) Patent No.: US 12,022,829 B2
(45) Date of Patent: Jul. 2, 2024

(54) WATER-DISPERSIBLE FINE PARTICLE

(71) Applicant: TOYOBO CO., LTD., Osaka (JP)

(72) Inventor: Hirofumi Hakuba, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 711 days.

(21) Appl. No.: 17/278,839

(22) PCT Filed: Sep. 20, 2019

(86) PCT No.: PCT/JP2019/037018
§ 371 (c)(1),
(2) Date: Mar. 23, 2021

(87) PCT Pub. No.: WO2020/066912
PCT Pub. Date: Apr. 2, 2020

(65) Prior Publication Data
US 2022/0030861 A1 Feb. 3, 2022

(30) Foreign Application Priority Data
Sep. 25, 2018 (JP) .................... 2018-178695

(51) Int. Cl.
*A01N 37/46* (2006.01)
(52) U.S. Cl.
CPC .................... *A01N 37/46* (2013.01)
(58) Field of Classification Search
CPC ................ A01N 37/46; A01N 25/12
See application file for complete search history.

(56) References Cited

U.S. PATENT DOCUMENTS

| 5,147,686 A * | 9/1992 | Ichimura ............... A01N 59/16 427/217 |
| 5,578,598 A | 11/1996 | Abe et al. |
| 5,658,915 A * | 8/1997 | Abe ................... C08G 73/0226 514/252.11 |
| 2011/0046040 A1 * | 2/2011 | Mutou ................... A01N 37/46 514/2.7 |
| 2011/0171144 A1 | 7/2011 | Wang et al. |

(Continued)

FOREIGN PATENT DOCUMENTS

| CN | 102552934 | 7/2012 |
| JP | 11-49620 | 2/1999 |

(Continued)

OTHER PUBLICATIONS

International Search Report issued Nov. 19, 2019 in International (PCT) Application No. PCT/JP2019/037018.
Gurunathan et al., "Enhanced antibacterial and anti-biofilm activities of silver nanoparticles against Gram-negative and Gram-positive bacteria", Nanoscale Research Letters, 2014, vol. 9, No. 373, pp. 1-17.

(Continued)

*Primary Examiner* — Benjamin J Packard
*Assistant Examiner* — Joshua A Atkinson
(74) *Attorney, Agent, or Firm* — Wenderoth, Lind & Ponack, L.L.P.

(57) ABSTRACT

The objective of the present invention is to provide a material to inhibit and/or remove a formation of a biofilm which material can be dispersed in water, of which effect can be sustained even in an environment such as water section, and which is highly safe and environmentally friendly. [Solution] The present invention relates to a fine particle comprising a complex consisting of a polycarboxylic acid derivative and a drug, wherein the fine particle is water-dispersible.

9 Claims, 7 Drawing Sheets

(56) References Cited

U.S. PATENT DOCUMENTS

| | | |
|---|---|---|
| 2013/0034650 A1 | 2/2013 | Li et al. |
| 2016/0339103 A1 | 11/2016 | Wang et al. |
| 2017/0202216 A1 | 7/2017 | Li et al. |
| 2020/0190101 A1 | 6/2020 | Niitsuma et al. |
| 2020/0260724 A1 | 8/2020 | Li et al. |

FOREIGN PATENT DOCUMENTS

| | | |
|---|---|---|
| JP | 2011-42603 | 3/2011 |
| JP | 2013-530255 | 7/2013 |
| JP | 5573111 | 8/2014 |
| JP | 5771143 | 8/2015 |
| JP | 5982088 | 8/2016 |
| WO | 92/09198 | 6/1992 |
| WO | 2017/086392 | 5/2017 |

OTHER PUBLICATIONS

Toyoda et al., "The Relationship between the Chemical State of Silver Nanoparticles and Their Antibacterial Activity under Antibacterial Test Conditions", J. Antibact. Antifung. Agents, 2018, vol. 46, No. 7, pp. 277-284, with partial English translation.

Office Action issued Apr. 8, 2022 in corresponding Chinese Application No. 201980062499.X, with English language translation.

Extended European Search Report issued May 3, 2022 in corresponding European Patent Application No. 19866123.3.

Office Action dated Sep. 28, 2021 in Chinese Patent Application No. 201980062499.X, with English-language translation.

Japanese Office Action issued Jun. 20, 2023, in Japanese Patent Application No. 2020-549137, with English translation.

\* cited by examiner

[Fig. 1]
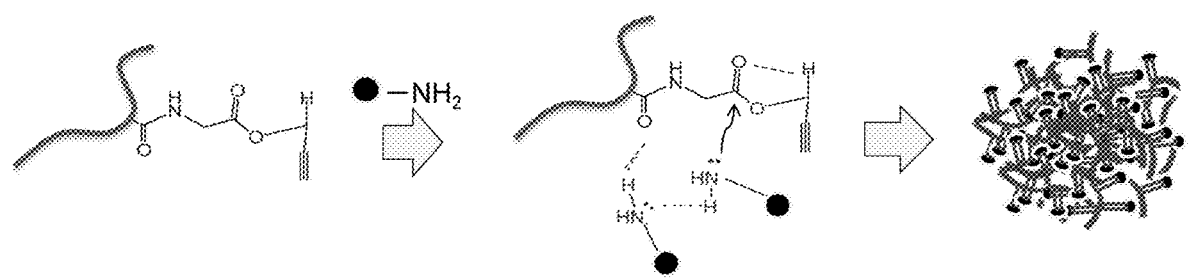

[Fig. 2]
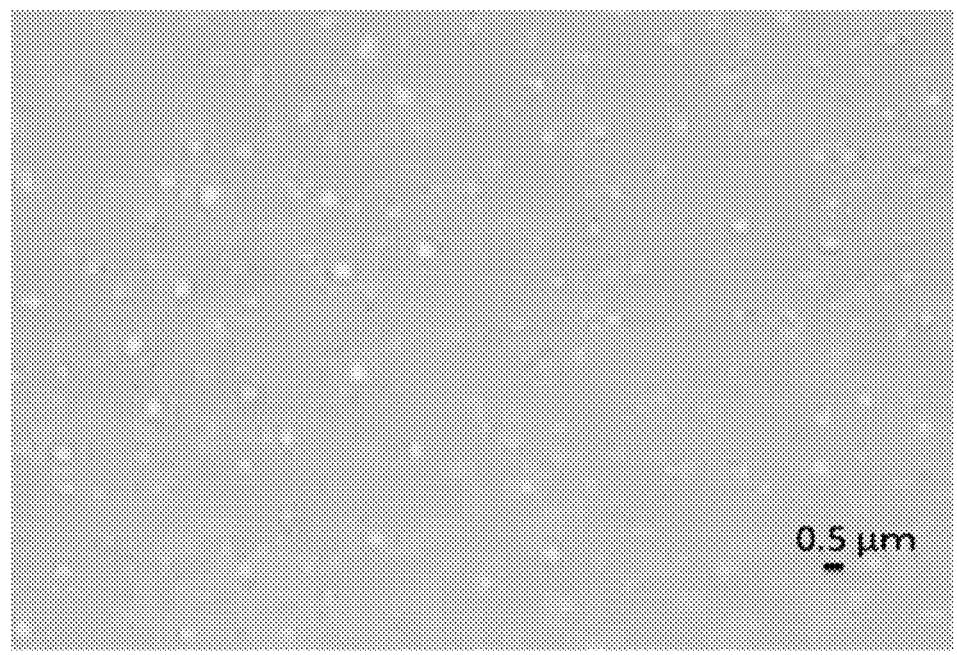

[Fig. 3]
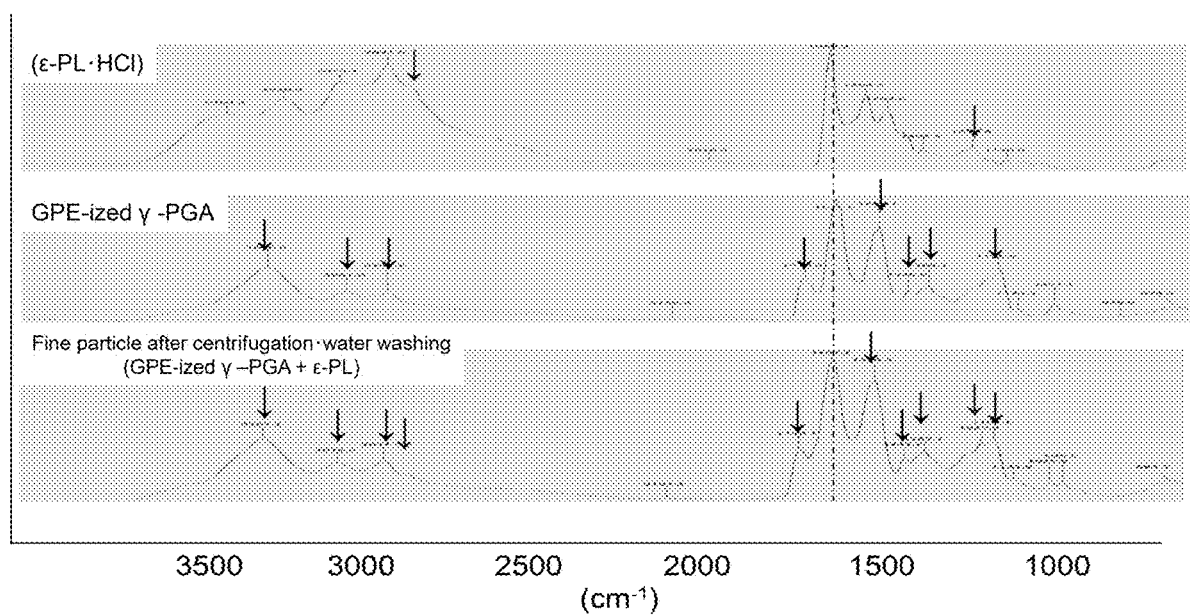

[Fig. 4]
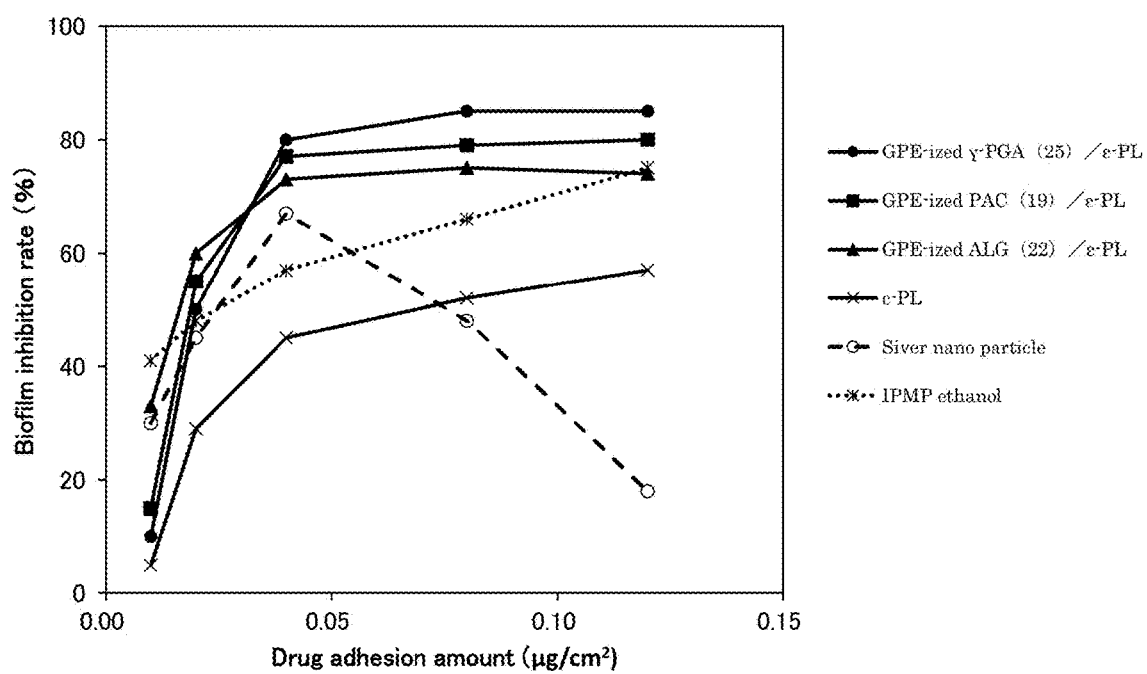

[Fig. 5]
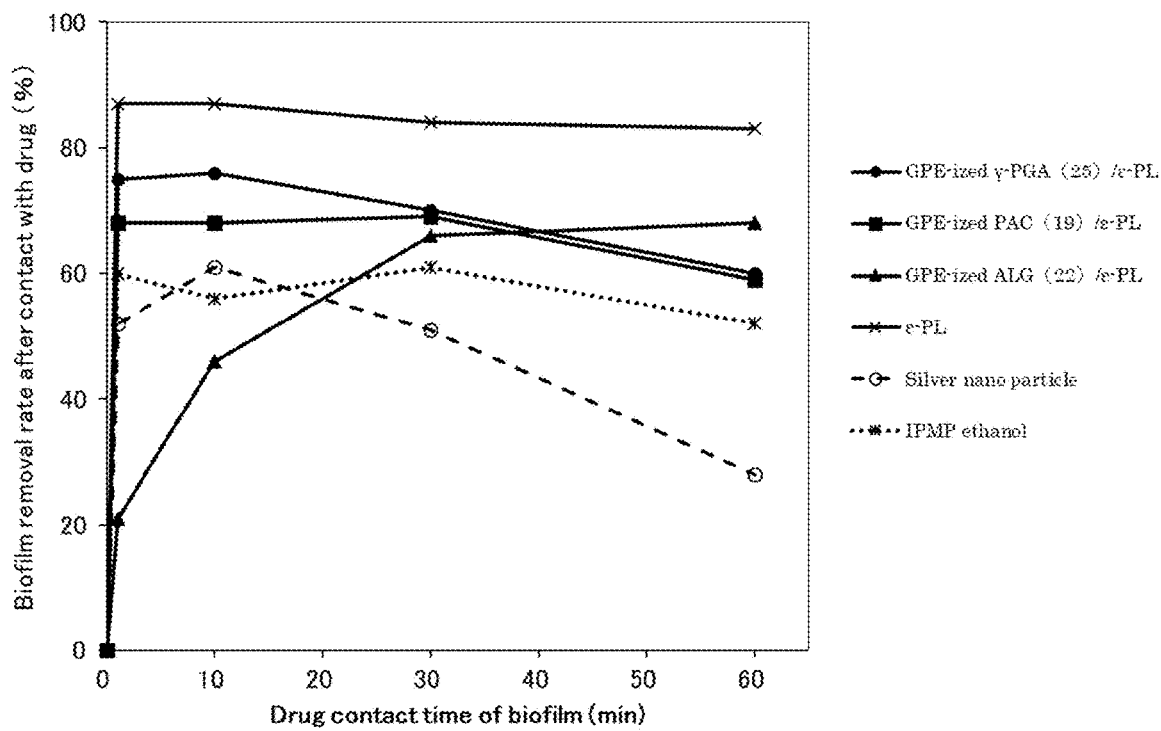

[Fig. 6]
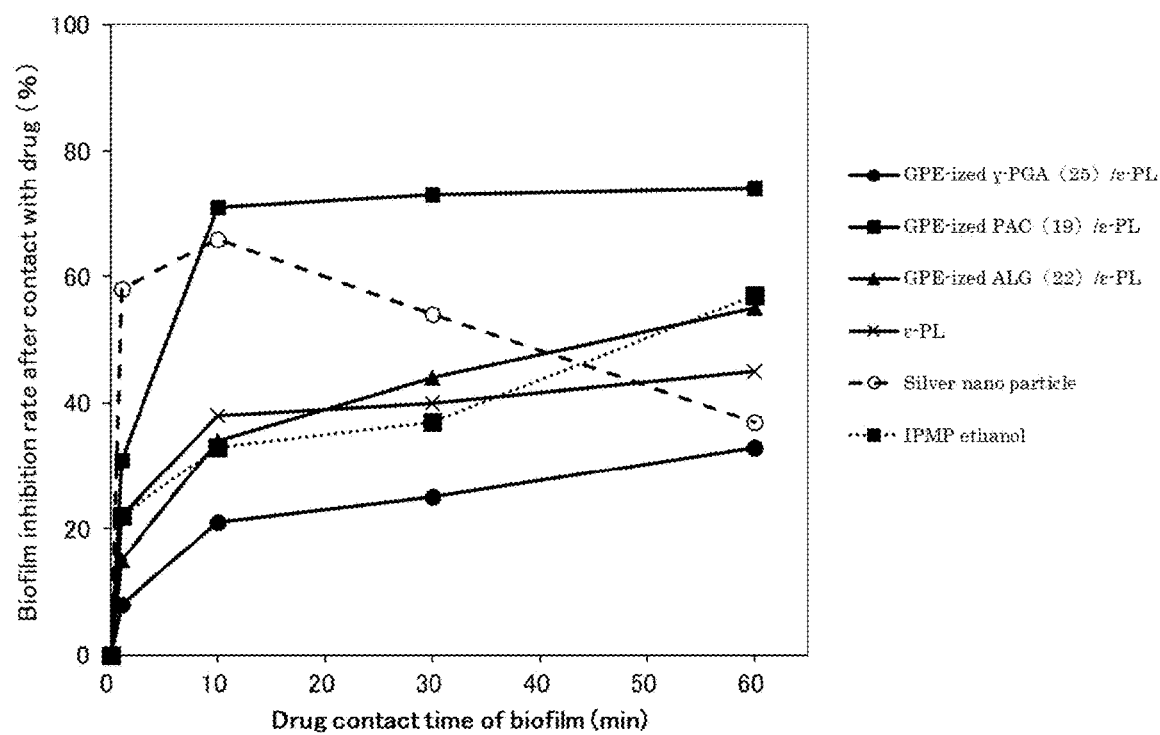

[Fig. 7]
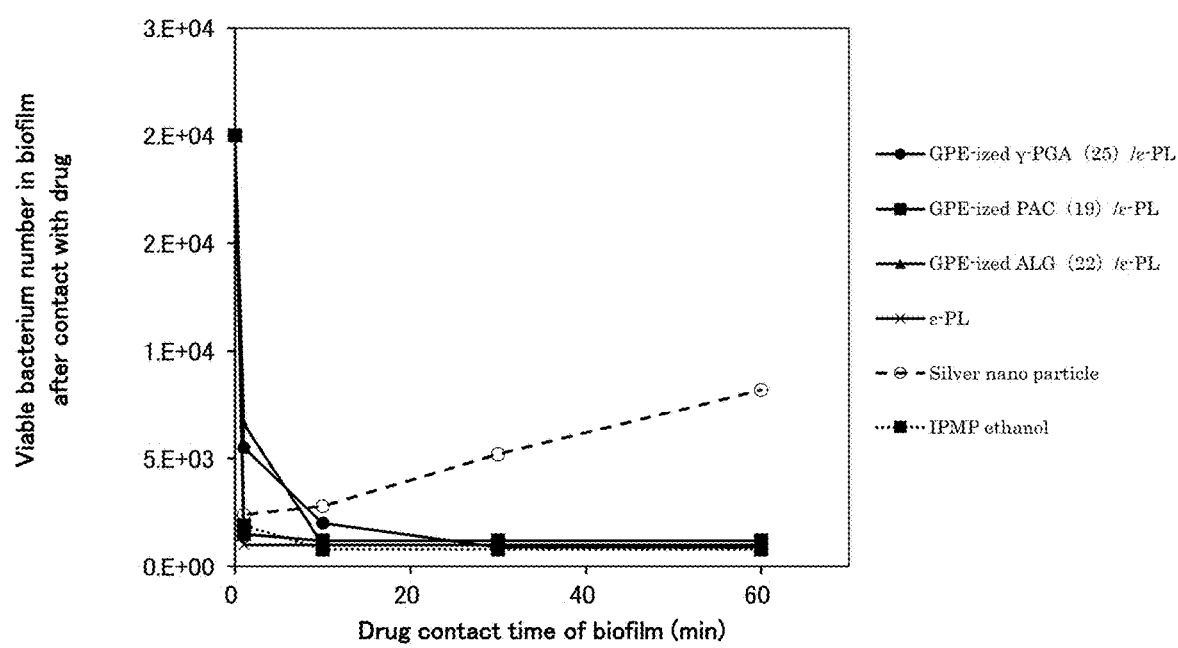

WATER-DISPERSIBLE FINE PARTICLE

TECHNICAL FIELD

The present invention relates to a material to remove a biofilm produced by a microorganism. In particular, the present invention relates to a composition to efficiently inhibit and remove a biofilm even under an environment conducive to the formation of a biofilm and even under a biofilm formation condition.

BACKGROUND ART

A biofilm is a structure produced by a microorganism which colonizes the surface of a material and known as so-called slime, and causes many problems such as an incidence of pathogen and a corrosion of a material in any environments of medical care, livelihood, industry or the like.

For example, there is a problem of an incidence of a drug-resistant bacterium in a medical setting such as a hospital and a care. A drug-resistant bacterium develops tolerance to a drug such as an antibacterial agent and an antibiotic drug. A drug-resistant bacterium is said to create an environment in which resistance to drugs and external stress can be easily acquired by forming a biofilm. A periodontal biofilm produced in the oral cavity of people who require long-term care may cause serious diseases such as aspiration pneumonia. In addition, a biofilm causes unpleasant odors, food poisoning and corrosion of a material in familiar water sections such as kitchen, bathroom and toilet.

After a microorganism has settled on the surface of a material, a biofilm is formed and grown in the process of a growth of the microorganism, and is released to the outside as a colony containing the microorganism and a pathogenic substance. Once a biofilm is formed, such a biofilm exhibits resistance to environmental stress, an antibacterial agent or the like, and it becomes difficult to remove a microorganism in the biofilm.

As a method for removing a biofilm, a cleaning treatment using an oxidizing disinfectant such as hypochlorous acid, ozone and chlorine dioxide may be performed in some cases. The application range of such an oxidizing disinfectant is, however, limited from the viewpoint of environment and safety, since an oxidizing fungicide has high corrosiveness.

A non-oxidizing biofilm sterilizer is known in order to solve the above problems instead of a highly corrosive oxidative sterilization method. For example, it is known that isopropylmethylphenol (IPMP) described in Patent document 1 permeates a periodontal pathogenic biofilm and exhibits a bactericidal property. When IPMP is used as a liquid, a solubilizer such as an organic solvent and a surfactant is needed to be used in combination and a formulation containing water as a base material may be impossible in some cases, since IPMP is water-insoluble.

Patent Document 2 discloses a biofilm remover using ε-poly-L-lysine (ε-PL). It is described in this document that when an aqueous solution containing ε-PL is allowed to act on a biofilm, the biofilm is removed. The ε-PL is known as a highly safe antibacterial polyamino acid, has a high solubility in water, and is excellent in prescribability as an aqueous solution. On the one hand, when ε-PL is used as a coating agent to inhibit a formation of a biofilm, ε-PL can hardly remain on the surface of a material or a biofilm due to a high solubility in water. In particular, an effect of ε-PL to inhibit and remove a biofilm may be lost in some cases depending on a usage environment such as water section where bacteria and a biofilm are easily increased.

It is necessary as described above to maintain an antibacterial effect within the range of an effective concentration at the site serving as a scaffold for a microorganism on the surface of a material in order to suppress the formation of a biofilm. It is described in Patent document 3 that a micelle containing an amphipathic block copolymer and an antibacterial agent remains on the surface of a tooth due to a binding property to improve a substantivity as a drug delivery system to suppress an oral biofilm formation.

Non-Patent Document 1 discloses a content relating to an anti-biofilm silver nanoparticle. The anti-biofilm effect of a silver nanoparticle is considered to be exerted by the permeation of the nano-sized silver nanoparticle into a biofilm to destroy a bacterium in the biofilm and the biofilm itself. It is however known that a silver nanoparticle easily agglutinates and an activity thereof is remarkably decreased due to the coexistence of an impurity such as a protein and a salt, though a silver nanoparticle is excellent in antibacterial property and antibiofilm property (Non-patent document 2). In addition, a silver nanoparticle is highly safe but persistent, and there is a concern about the occurrence of argyria and environmental pollution.

An example of an agent to effectively inhibit and remove a biofilm includes a polymer micelle and a nanomaterial such as a metal nanoparticle as prior arts, but there remain many technical issues such as water dispersibility, persistence on the surface of a material, persistence in an environment such as water section, safety and biodegradability.

PRIOR ART DOCUMENT

Patent Document

Patent document 1: JP 5573111 B
Patent document 2: JP 5982088 B
Patent document 3: JP 5771143 B

Non-Patent Document

Non-patent document 1: Nanoscale Research Letters, 2014, 9, 373
Non-patent document 2: J. Antibact. Antifung. Agents, 2018, 46, 7, 277-284

DISCLOSURE OF THE INVENTION

Problems to be Solved by the Invention

The objective of the present invention is to provide a material to inhibit and/or remove a formation of a biofilm which material can be dispersed in water, of which effect can be sustained even in an environment such as water section, and which is highly safe and environmentally friendly.

Means for Solving the Problems

The inventor of the present invention repeated intensive studies; and as a result, completed the present invention by finding that the above-described problems can be solved by the following means.

The present invention is hereinafter described.
[1] A fine particle,
comprising a complex consisting of a polycarboxylic acid derivative and a drug,
wherein the fine particle is water-dispersible.

[2] The fine particle according to the above [1], wherein the fine particle is an aggregate of the complex.

[3] The fine particle according to the above [1] or [2], wherein the drug comprises an antimicrobial peptide.

[4] The fine particle according to any one of the above [1] to [3], wherein the drug comprises ε-poly-L-lysine.

[5] The fine particle according to any one of the above [1] to [4], wherein the polycarboxylic acid derivative is a compound produced by condensing a polycarboxylic acid and a propargyl amino acid represented by the following formula (1):

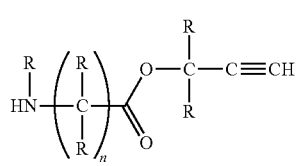

(1)

wherein
R is a hydrogen atom or a $C_{1-8}$ hydrocarbon group,
a plurality of hydrogen atom in the hydrocarbon group may be substituted by a nitrogen atom, an oxygen atom or a sulfur atom,
n is an integer of 1 or more and 3 or less.

[6] The fine particle according to any one of the above [1] to [5], wherein the polycarboxylic acid is one or more selected from the group consisting of polyglutamic acid, polyacrylic acid, alginic acid and salts thereof.

[7] The fine particle according to any one of the above [1] to [6], wherein an average particle size is 0.05 μm or more and 0.7 μm or less.

[8] The fine particle according to any one of the above [1] to [7], wherein a molar ratio of the drug to the propargyl amino group of the polycarboxylic acid derivative is 0.1 or more and 0.75 or less.

[9] An antimicrobial agent and/or a biofilm remover comprising the fine particle according to any one of the above [1] to [8].

Effect of the Invention

The fine particle of the present invention has excellent water dispersibility and biofilm removability, can also be used as a coating agent to suppress a biofilm formation, and can sustainably suppress a biofilm formation even in an aquatic environment where a bacterium can easily grow. In addition, the burden on the environment is small, since a raw material derived from a natural product is used.

BRIEF DESCRIPTION OF THE DRAWINGS

FIG. 1 is a schematic diagram showing the formation process of the fine particle.

FIG. 2 is an optical micrograph showing the dispersed state of the fine particle in water.

FIG. 3 is an IR spectrum chart of the fine particle of the present invention.

FIG. 4 is a graph to demonstrate the relationship between the amount of the adhered drug and the biofilm suppression rate.

FIG. 5 is a graph to demonstrate the relationship between the drug contact time with the biofilm and the biofilm removal rate.

FIG. 6 is a graph to demonstrate the relationship between the drug contact time with the biofilm and the biofilm removal rate.

FIG. 7 is a graph to demonstrate the relationship between the drug contact time with the biofilm and the number of the viable bacterium in the biofilm.

MODE FOR CARRYING OUT THE INVENTION

The present invention relates to a water dispersible polymer fine particle comprising a complex consisting of a polycarboxylic acid derivative and a drug. The polycarboxylic acid derivative is a graft polymer formed by introducing a substituent interacting with the drug to a polycarboxylic acid. The particle excellent in a dispersibility can be formed by the formation of a strong bond such as a hydrogen bond and a covalent bond between the polycarboxylic acid derivative and the drug. In addition, it is expected that the contained drug remains and the effect is sustained, since the particle can remain on the surface of a material and a biofilm for a long time and the permeability into a biofilm is improved.

The drug of the present invention preferably has functions of anti-microorganism, microbicidal, sterilization and demicroorganism against a microorganism involved in a production of a biofilm. An example of the drug specifically includes an organic antimicrobial and antibacterial agent such as antimicrobial and antibacterial peptide, quaternary ammonium salt, biguanide compound, thiazoline compound, imidazole compound, glyceride compound, carbamate compound, sulfamide compound, pyridine compound, phenol compound and halogenated compound. An antimicrobial and antibacterial peptide is particularly preferred in terms of environmentally friendly property and high safety. The antimicrobial and antibacterial peptide is preferably exemplified by ε-poly-L-lysine (ε-PL), protamine, lysozyme, nisin, defensin, colistin, indolicidin and melittin, and is more preferably ε-PL in terms of availability of a raw material and general versatility. The above-described ε-PL is an amino acid homopolymer formed by a peptide bond between the amino group at the ε position and the carboxy group of L-lysine, which is one kind of an essential amino acid, and by bonding about 25 to 30 lysines in a linear state. Such a polylysine is available from, for example, Toronto Research Chemicals Inc.

The polycarboxylic acid derivative of the present invention is a derivative formed by modifying a carboxylic acid having two or more carboxy groups in the molecule with at least one of propargyl amino acids. An example of such a carboxylic acid having two or more carboxy groups in the molecule includes a low molecular carboxylic acid such as malonic acid, succinic acid, glutaric acid, adipic acid, citric acid and tartaric acid; a high molecular synthetic polymer such as polyacrylic acid and polymethacrylic acid; a natural polysaccharide such as pectin, alginic acid, hyaluronic acid and carboxymethylcellulose; and a polypeptide such as poly-γ-glutamic acid, poly-α-glutamic acid and polyaspartic acid. Poly-γ-glutamic acid, polyacrylic acid, alginic acid and salts thereof are particularly preferred in terms of a plurality of cross-linking points in the molecule and high safety.

The propargyl amino acid in the present invention is an amino acid derivative represented by the formula (1). In the formula, R is a hydrogen atom or a $C_{1-8}$ hydrocarbon group. A plurality of hydrogen atom in the hydrocarbon group may be substituted with a nitrogen atom, an oxygen atom or a sulfur atom. The R in the formula may be the same as or different from each other. The n in the formula is an integer of 1 or more and 3 or less.

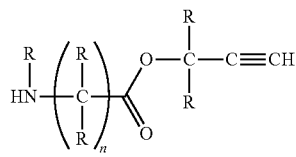

(1)

The amino acid which constitutes the propargyl amino acid represented by the formula (1) is not restricted. If the amino acid is commercially available, the amino acid may be used. The amino acid which constitutes a biological protein is preferably used in terms of safety. An example of the amino acid which constitutes a biological protein includes asparagine, aspartic acid, alanine, arginine, cysteine·cystine, glutamine, glutamic acid, glycine, proline, serine, tyrosine, isoleucine, leucine, valine, histidine, lysine, methionine, phenylalanine, threonine and tryptophan, and the L-form of any of the amino acids is preferably used. Glycine is particularly preferably used, since glycine is easily available, highly safe and a material having the simplest structure.

The propargyl amino acid represented by the general formula (1) can be obtained by condensing the above-described amino acid and a propargyl alcohol or a halogenated propargyl compound as described in the following reaction formula (2). More specifically, the propargyl amino acid can be easily produced by mixing the amino acid and propargyl alcohol or the like to be dissolved and adding a condensing agent such as thionyl chloride to be reacted. The X in the formula is a hydroxy group or a halogeno group. The R in the formula is a hydrogen atom or a $C_{1-8}$ hydrocarbon group. A plurality of the hydrogen atom in the hydrocarbon group may be substituted with a nitrogen atom, an oxygen atom or a sulfur atom. The R in the formula may be the same as or different from each other. The n is an integer of 1 or more and 3 or less.

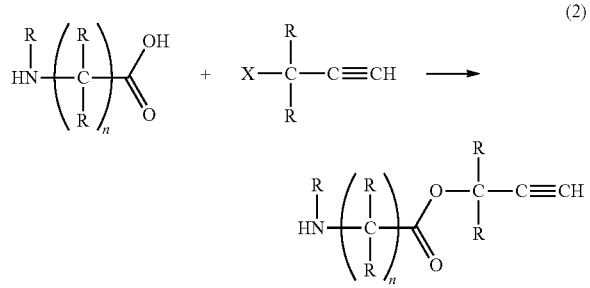

(2)

The polycarboxylic acid derivative of the present invention can be obtained by condensing the carboxy group of the polycarboxylic acid with the propargyl amino acid represented by the general formula (1) as the following reaction formula (3). The polycarboxylic acid derivative can be produced by reacting the polycarboxylic acid and the propargyl amino acid at room temperature, i.e. 1° C. or higher and 30° C. or lower, in the presence of a condensing agent as a method for condensing the polycarboxylic acid and the propargyl amino acid. More specifically, the polycarboxylic acid derivative can be produced by dissolving the polycarboxylic acid in a solvent, then adding the above-described produced propargyl amino acid, and further adding a condensing agent and a reaction promoter if needed. It is preferred at the time that an equivalent amount of the propargyl amino acid as a carbonate active group to the carbonate unit constituting the polycarboxylic acid is adjusted to 0.25 or more and 1.0 or less. When the molar ratio of the propargyl amino acid to the carbonate unit is excessively small, the reaction may not be sufficiently proceed and a modification rate may be decreased in some cases. On the one hand, when the molar ratio of the propargyl amino acid to the carbonate unit is excessively large, amounts of an unreacted raw material and a by-product may be large in some cases.

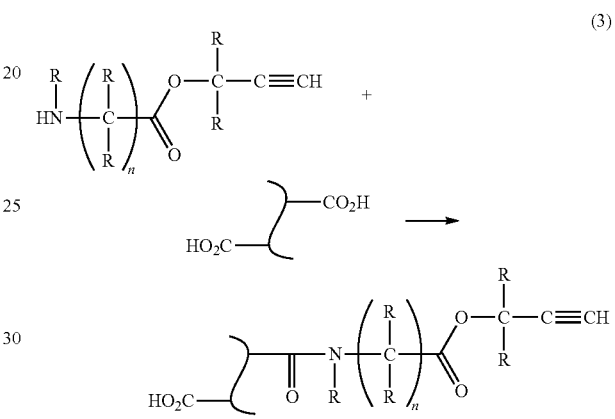

(3)

An example of the condensing agent in the present invention includes N,N'-dicyclohexylcarbodiimide (DCC), 1-ethyl-3-(3-dimethylaminopropyl)carbodiimide hydrochloride salt (WSC) and O-(benzotriazole-1-yl)-N,N,N',N'-tetramethyluronium hexafluorophosphate (HBTU). An equivalent amount of the condensing agent to the carbonate unit which constitutes the polycarboxylic acid is preferably 0.25 or more and 1.0 or less.

A reaction solvent for the condensing reaction in the present invention is not particularly restricted as long as the solvent dissolves the polycarboxylic acid and is exemplified by water, dimethylformamide (DMF), dimethylsulfoxide (DMSO) and tetrahydrofuran (THF).

A base, a catalyst and an active ester compound are preferably added to the reaction mixture as a reaction promoter to accelerate the condensing reaction in the present invention. An example of the base includes an amine such as triethylamine ($Et_3N$) and N,N-diisopropylethylamine; and a carbonate salt such as sodium carbonate and sodium hydrogencarbonate. An example of the catalyst includes N,N-dimethyl-4-aminopyridine (DMAP). An example of the active ester compound includes 1-hydroxybenzotriazole (HOBt) and N-hydroxysuccinimide (NHS) as a reaction intermediate ester. When a base is added, an equivalent amount of the base to the carbonate unit which constitutes the polycarboxylic acid is preferably adjusted to 0.5 or more and 1.5 or less. When an active ester compound is added, an equivalent amount of the active ester compound to the carbonate unit which constitutes the polycarboxylic acid is preferably adjusted to 0.25 or more and 1.0 or less.

A modification rate of the polycarboxylic acid with the propargyl amino acid can be changed by changing a charge amount of each raw material such as the propargyl amino acid and the condensing agent. When the polycarboxylic acid is used, a modification rate with the propargyl amino acid per the carboxylate unit is preferably 1% or more and 55% or less, more preferably 5% or more and 50% or less, and even more preferably 10% or more and 50% or less. When the modification rate exceeds 55%, a dissolubility in a solvent may become worse. A size of the fine particle containing a drug inside can be adjusted by adjusting the modification rate of the polycarboxylic acid with the polycarboxylic acid within the above-described range.

The polycarboxylic acid is precipitated to be recovered after the reaction by adding a poor solvent in the present invention. Such a poor solvent is an organic solvent in which the polycarboxylic acid derivative is not dissolved. The poor solvent is not particularly restricted as long as the polycarboxylic acid derivative is not dissolved in the poor solvent and the poor solvent has a good dispersibility, and is exemplified by acetone, methanol, ethanol, isopropyl alcohol and an acetate ester. An amount of the poor solvent is preferably 3 times or more and 10 times or less to the reaction solvent. When an amount of the added poor solvent is excessively small, the polycarboxylic acid derivative may not be sufficiently precipitated in some cases. When an amount of the added poor solvent is excessively large, a cost for washing may be increased.

When an impurity is removed after the polycarboxylic acid derivative is recovered in the present invention, the polycarboxylic acid derivative may be purified by a so-called dissolution-reprecipitation method. Specifically, the polycarboxylic acid derivative is dissolved in a good solvent such as water, and then the polycarboxylic acid derivative is precipitated again by adding a poor solvent in the stirred solution at room temperature. When the dissolution-reprecipitation method is repeated 1 to 3 times as needed, an impurity can be reduced down to equal to or lower than a detection limit. The good solvent is not particularly restricted as long as the polycarboxylic acid derivative is dissolved in the good solvent, and water is preferred in terms of safety and environmental impact. The poor solvent is not particularly restricted as long as the polycarboxylic acid derivative is difficult to be dissolved in the poor solvent and is preferably exemplified by acetone, methanol and ethanol.

An amount of the good solvent can be adjusted depending on the dissolubility of the polycarboxylic acid derivative, and a high concentration is preferred in terms of an industrial productivity. For example, an amount of the good solvent is preferably 10 wt % or more and 60 wt % or less and more preferably 10 wt % or more and 30 wt % or less.

An amount of the poor solvent can be adjusted depending on the dissolubility of the polycarboxylic acid derivative, and may be a minimum amount to precipitate the polycarboxylic acid derivative. For example, an amount of the poor solvent is preferably 2 times or more and 12 times or less to the good solvent.

An impurity can be further reduced by repeating the above-described purification. The purification may be conducted 1 or 2 times in terms of a production cost.

The thus obtained polycarboxylic acid derivative is a condensed compound formed by condensing the propargyl amino acid to the carboxy group of the polycarboxylic acid and is an amphiphatic molecule which is composed of the hydrophilic part of the carboxy group and the hydrophobic part of the propargyl amino group.

When the polycarboxylic acid derivative is coexistent with the drug in the solvent capable of dissolving the compounds, i.e. in the reaction mixture, in the present invention, the complex is formed by binding the drug to the propargyl amino acid part of the polycarboxylic acid derivative and the complex becomes self-assembled to form the fine particle (FIG. 1). A particle diameter of the fine particle can be adjusted by the modification rate of the carboxy group of the polycarboxylic acid derivative with the propargyl amino acid and the concentration of the drug. An average particle diameter of the fine particle is not particularly restricted and is preferably 0.05 μm or more and 0.7 μm or less. When the particle diameter is excessively large, the particle cannot penetrate a biofilm.

When the fine particle is produced in the present invention, with respect to an amount of the drug to the polycarboxylic acid derivative in the reaction mixture, a molar ratio of the drug to the propargyl amino group of the polycarboxylic acid derivative is preferably 0.1 or more and 0.75 or less and more preferably 0.15 or more and 0.65 or less. When the molar ratio is excessively large, the fine particle may be easily aggregated and a re-dispersibility in a liquid may become worse in some cases. When the molar ratio is excessively small, the fine particle effective for anti-biofilm may not be obtained in some cases.

A solvent to prepare the fine particle in the present invention is not particularly restricted as long as both of the polycarboxylic acid derivative and the drug are dissolved in the solvent, and water is preferred in terms of environment and safety. If needed, an additive such as dispersing agent, surfactant and solubilizing agent may be used.

When an antimicrobial and antibacterial agent is used in the present invention, a concentration of the drug in the reaction mixture during the production of the fine particle may be determined in reference to the values of a minimum inhibitory concentration (MIC) and a minimum bactericidal concentration (MBC). For example, when ε-PL is used, the concentration is preferably 0.01 wt % or more and 1 wt % or less and more preferably 0.02 wt % or more and 0.1 wt % or less. The concentration over 1 wt % may become disadvantage in terms of a raw material cost in some cases, and when the concentration is less than 0.01 wt %, an anti-biofilm property may be decreased in some cases.

The concentration of the polycarboxylic acid derivative in the reaction mixture during the production of the fine particle in the present invention may be determined depending on the balance between an effective concentration and a molar ratio of the drug. For example, the concentration is preferably 0.1 wt % or more and 1 wt % or less and more preferably 0.5 wt % or more and 1 wt % or less. The concentration over 1 wt % may become disadvantage in terms of a raw material cost in some cases, and when the concentration is less than 0.01 wt %, an anti-biofilm property may be decreased in some cases due to a lower concentration of the drug in the fine particle.

When water is used as the reaction solvent, the obtained fine particle can be directly used as a fine particle suspension for a use application such as anti-microorganism, microbicidal, sterilization and demicroorganism and for removing a biofilm. Such a fine particle suspension in this disclosure means that the fine particle does not form an aggregate as described as FIG. 2 and the fine particle homogenously exists in the suspension. For example, the fine particle suspension is diluted or concentrated as needed to be dispersed or sprayed to the already formed biofilm. It is preferred that the suspension is dispersed or sprayed on a biofilm and then left to be static at an ordinary temperature for at least one minute or more. If needed, a surfactant, a proteolytic enzyme, a polysaccharide degrading enzyme, a DNase, a bleaching agent or the like may be added or used in combination.

The fine particle may be used by being dispersed or sprayed on an already formed biofilm; and in addition, a colonization of a microorganism or a formation of a biofilm on the surface of a material can be inhibited by preliminarily coating the surface of a material on which a biofilm has not been still formed as an anti-biofilm coating in the present invention. Such a coating membrane can inhibit a formation of a biofilm for a long time by maintaining an anti-microorganism property without being easily drained away, since the particle is immobilized on the surface of a material due to an interaction between the carboxylic acid group on the surface of the fine particle and the surface of a material or due to a physical adsorption of the fine particle on the surface of a material.

When the fine particle is used as an anti-biofilm coating in the present invention, an adsorption amount of the drug adsorbed on the surface of a material through the fine particle is preferably 0.04 µg/cm² or more and 0.12 µg/cm² or less. When the adsorption amount of the drug is excessively small, the effect to inhibit a formation of a biofilm may not be sufficiently exerted in some cases. An excessively large adsorption amount of the drug may be disadvantageous in terms of cost-effectiveness.

When the surface of a material is subjected to an anti-biofilm coating treatment, an example of such a material to be applied includes ceramic, metal, metal oxide, plastic, rubber, mineral and wood.

The fine particle in the present invention can be applied to many industrial use applications in water section or the like, such as kitchen, toilet and bath, as a countermeasure in not only a general household but also a medical setting such as hospital and nursing care field, since the fine particle is composed of a material which is safe for an ecosystem and can be dispersed in water.

EXAMPLES

Hereinafter, the examples are described to demonstrate the present invention more specifically, but the present invention is in no way restricted by the examples.
Production of Glycine 2-propyn-1-yl Ester (GPE)

A mixed liquid containing 2.1 g of glycine manufactured by NACALAI TESQUE and 30 mL of 2-propyn-1-ol manufactured by NACALAI TESQUE was prepared, and 2.4 mL of thionyl chloride manufactured by NACALAI TESQUE was added thereto at room temperature. The reaction mixture was stirred at room temperature for 2 hours and further at 50° C. for 2 hours. The reaction mixture was cooled to 5° C., and 90 mL of ethyl acetate was added thereto to obtain a precipitate. The precipitate was obtained by filtration, further washed using 30 mL of ethyl acetate three times, and dried at 50° C. for 12 hours to obtain glycine 2-propyn-1-yl ester (2-propynyl aminoethanoate, GPE).
Measurement of Modification Rate with Propargyl Amino Acid A modification rate of the carboxy group constituting the polycarboxylic acid derivative with propargyl amino acid was determined by measuring $^1$H-NMR spectrum in $D_2O$ using MR400 manufactured by BRUKER. The modification rate was calculated in accordance with the following formula by measuring an integrated strength ratios of the α-hydrogen of the carboxy group which was modified with the propargyl amino acid and the carboxy group which was not modified.

Modification rate (%)=[αhydrogen of modified carboxy group]/[(αhydrogen of unmodified carboxy group)+(αhydrogen of modified carboxy group)]×100

Measurement of Particle Diameter

To pure water in a batch cell, 0.1 mL of a fine particle suspension liquid was added. A laser light was irradiated to the stirred diluted liquid from a nano particle size analyzer ("SALD-7500nano" manufactured by SHIMADZU CORPORATION), and an average particle diameter of the fine particle in the suspension was measured at a measurable refractive index.
Measurement of IR Spectrum The fine particle suspension was centrifuged at 4000 rpm for precipitation. The fine particle was washed using 2 mL of pure water three times and dried in vacuo at room temperature for 24 hours, and IR spectrum was measured using an infrared spectrometer (FT-IR apparatus manufactured by PerkinElmer, model number: SpectrumOne/Multi-Scope).
Measurement of Biofilm Amount A test piece was taken out after the cultivation and washed using normal saline, and a biofilm amount adhered on the test piece surface was measured. The biofilm amount was measured by CV (crystal violet) staining method. Specifically, a test piece was immersed in 0.1 wt % CV aqueous solution for 30 minutes, an excessive CV was washed out using water, an extraction from the stained region was carried out using 98% ethanol, and an absorbance of 500 nm was measured.
Measurement of Viable Bacterium Number A number of a viable bacterium in the biofilm was measured by adding 1 mL of normal saline to the surface material on which a biofilm was adsorbed, destroying the biofilm using a ultrasonic washing machine, collecting an elution liquid, diluting the elution liquid from $10^2$ to $10^8$ using normal saline, inoculating the diluted solution into petri Film™ broth manufactured by 3M, performing cultivation at 30° C. for 1 week, and counting colonies.

Production Example 1: Production of GPE-ized γ-PGA (40)

A mixture of 0.5 g of poly-L-glutamic acid sodium salt (γ-PGA) manufactured by TOYOBO and 6 mL of water was stirred at room temperature. To the solution, 0.75 equivalents of 1-ethyl-3-(3-dimethylaminopropyl)carbodiimide hydrochloride (WSC) to the carboxylate unit constituting γ-PGA and 1-hydroxybenzotriazole (HOBt) were added to be reacted at room temperature for 24 hours. After the reaction, 35 mL of acetone was added to precipitate a polymer. The obtained polymer was washed and dried. The crude polymer was dissolved in 5.5 mL of water after drying, and 60 mL of acetone was added to precipitate the polymer again. The polymer was obtained by filtration. The polymer was dried at 60° C. in vacuo for 12 hours to obtain the target GPE-ized γ-PGA. It was determined by $^1$H-NMR ($D_2O$) that a modification rate of the carboxylate unit of γ-PGA with GPE was 40%. The obtained polycarboxylic acid derivative is referred to as GPE-ized γ-PGA (40).

Production Example 2: Production of GPE-ized γ-PGA (25)

The polycarboxylic acid derivative was produced by a similar method as Production example 1 except that 0.5 equivalents of GPE, WSC and HOBt were used as raw materials. It was determined by $^1$H-NMR (D$_2$O) that a modification rate of the carboxylate unit of γ-PGA with GPE was 25%. The obtained polycarboxylic acid derivative is referred to as GPE-ized γ-PGA (25).

Production Example 3: Production of GPE-ized γ-PGA (15)

The polycarboxylic acid derivative was produced by a similar method as Production example 1 except that 0.25 equivalents of GPE, WSC and HOBt were used as raw materials. It was determined by $^1$H-NMR (D20) that a modification rate of the carboxylate unit of γ-PGA with OPE was 15%. The obtained polycarboxylic acid derivative is referred to as GPE-ized γ-PGA (15).

Production Example 4: Production of GPE-ized PAC (19)

The polycarboxylic acid derivative was produced by a similar method as Production example 1 except that sodium polyacrylate aqueous solution (PAC) manufactured by NIPPON SHOKUBAI CO., LTD., and 0.5 equivalents of GPE, WSC and HOBt were used as raw materials. It was determined by $^1$H-NMR (D$_2$O) that a modification rate of the carboxylate unit of PAC with GPE was 19%. The obtained polycarboxylic acid derivative is referred to as GPE-ized PAC (19).

Production Example 5: Production of GPE-ized ALG (22)

The polycarboxylic acid derivative was produced by a similar method as Production example 1 except that sodium alginate (ALG) manufactured by NACALAI TESQUE, INC. was used as a raw material. It was determined by $^1$H-NMR (D$_2$O) that a modification rate of the carboxylate unit of ALG with GPE was 22%. The obtained polycarboxylic acid derivative is referred to as GPE-ized ALG (22).
Production of Fine Particle Suspension of GPE-ized γ-PGA/ ε-PL To 0.005 g of the GPE-ized γ-PGA produced in Production examples 1 to 3, 0.5 mL of water was added to be dissolved at room temperature. To the solution, 0.5 mL of 0.02 to 0.18 wt % aqueous solution of ε-PL hydrochloride manufactured by Toronto Research Chemicals was added. The mixture was stirred at room temperature to obtain a fine particle suspension. A measured average particle diameter of fine particles in the obtained suspension was shown in Table 1. It was confirmed that when a molar ratio of ε-PL to the GPE group of the polymer was included within the range of 0.16 or more and 0.63 or less, fine particles having an average particle diameter of 0.064 μm or more and 0.624 μm or less were obtained. When the molar ratio exceeded 0.75, the particles tended to aggregate and a dispersibility tended to become worse. When a mixed liquid of un-GPE-ized γ-PGA and ε-PL was prepared, an aggregate was immediately observed and the above-described fine particle could not be obtained. IR spectrum was measured using an infrared spectrometer manufactured by SHIMADZU CORPORATION by centrifuging the fine particle using a centrifuge, and washing with water and drying the particle in order to analyze a composition of the fine particle obtained in Example 1. The IR spectrum is shown in FIG. 3. It was confirmed that the obtained fine particle was a composition containing both components of the GPE-ized γ-PGA and ε-PL, since an absorption peaks derived from the GPE-ized γ-PGA and ε-PL of the obtained fine particle were observed.

TABLE 1

| | GPE-ized γ-PGA | | ε-PL/ | | |
|---|---|---|---|---|---|
| | GPE modification rate (%) | Aq solution concentration (wt %) | ε-PL concentration (wt %) | GPE group molar ratio | Average particle diameter (μm) |
| Example 1 | 40 | 0.5 | 0.09 | 0.39 | 0.624 |
| Example 2 | ↑ | ↑ | 0.045 | 0.2 | 0.506 |
| Example 3 | 25 | ↑ | 0.09 | 0.31 | 0.403 |
| Example 4 | ↑ | ↑ | 0.045 | 0.16 | 0.12 |
| Example 5 | ↑ | 0.5 | 0.09 | 0.63 | 0.499 |
| Example 6 | ↑ | ↑ | 0.045 | 0.31 | 0.449 |
| Example 7 | ↑ | 0.25 | 0.025 | 0.35 | 0.126 |
| Example 8 | ↑ | ↑ | 0.013 | 0.17 | 0.064 |
| Example 9 | 15 | 0.5 | 0.045 | 0.52 | 0.445 |
| Example 10 | ↑ | ↑ | 0.04 | 0.47 | 0.147 |
| Example 11 | ↑ | ↑ | 0.02 | 0.23 | 0.137 |
| Comparative example 1 | 40 | ↑ | 0.18 | 0.78 | aggregated |
| Comparative example 2 | 25 | ↑ | 0.18 | 1.26 | aggregated |
| Comparative example 3 | 15 | ↑ | 0.18 | 2.1 | aggregated |
| Comparative example 4 | ↑ | ↑ | 0.09 | 1.05 | aggregated |
| Comparative example 5 | 0 | ↑ | 0.09 | — | aggregated |
| Comparative example 6 | ↑ | ↑ | 0.045 | — | aggregated |

Test Example 1: Preparation of *P. fluorescens* Liquid

*P. fluorescens*, which is a gram-negative bacillus having high productivity of a biofilm, was used for evaluating an anti-biofilm property. A dried standard product of *P. fluorescens* was obtained as NBRC No. 14160 and recovered by the following method. DAIGO growth medium 802 (8.4 g) manufactured by Wako Pure Chemical Corporation and 300 mL of purified water were weighed and added into a beaker, and the mixture was stirred at room temperature for about 30 minutes for dispersion. A recovering liquid was sterilized by an autoclave, 0.2 mL of the recovering liquid was taken out using a micropipette and added into an ample of a dried standard product of *P. fluorescens*, and the mixture was stirred. Separately, 25 mL of SCD broth (Soybean-Casein Digest Broth) manufactured by Wako Pure Chemical Corporation was added in a flask, and 100 of the above *P. fluorescens* suspension was subsequently added thereto. The bacterium was cultivated at 30° C. and a velocity of 150 rpm in a constant temperature incubator shaker for 24 hours for cultivation. After the cultivation, the bacterium was added in 80% glycerol, and the bacterium liquid was preserved at −80° C.

Test Example 2: Anti-Biofilm Coat Test Using Fine Particle Suspension

A fine particle suspension of ε-PL was prepared by using the GPE-ized polycarboxylic acid of Production examples 1 to 5 as a test sample liquid for an anti-biofilm coat. A fine particle suspension was prepared by mixing the both of the aqueous solutions of the GPE-ized polycarboxylic acid and ε-PL so that a concentration of the GPE-ized polycarboxylic acid in the fine particle suspension became 0.5 wt % and a concentration of ε-PL became 0.045 wt %. For comparison, a simple ε-PL aqueous solution, an IPMP (4-isopropyl-3-methylphenol, manufactured by Wako Pure Chemical Corporation) ethanol solution and a silver nano particle aqueous suspension manufactured by JAPAN ION Corporation having concentrations of 0.045 wt % were respectively produced. A polyvinyl chloride test piece having an area of 1 cm$^2$ was coated with each test sample liquid so that an adhesion amount of each antimicrobial component became 0.04 to 0.12 μg/cm$^2$, and was dried in vacuo at 30° C. for 12 hours. The test piece coated with each drug was stirred at 25° C. and 350 rpm for 1 minute for washing with water as a water section environment. The test piece after the water washing was immersed in a broth containing the bacterium liquid prepared in Test example 1, and a biofilm was formed by a cultivation at 30° C. for 48 hours. A concentration was adjusted to 10 cfu/mL by diluting the P. fluorescens liquid with SCD broth. The test piece was taken cut after the cultivation, washed using normal saline, and an amount of a biofilm adhered on the surface of the test piece was measured. A biofilm inhibition rate was calculated by the following formula:

Biofilm inhibition rate (%)=(measurement value of untreated test piece−measurement value of test piece coated with test liquid)/(measurement value of untreated test piece)×100

The results of adhesion amount of each coating agent and biofilm inhibition rate are shown in Table 2 and FIG. 4. It was confirmed that a biofilm was inhibited by up to about 85% by using GPE-ized polycarboxylic acid/ε-PL fine particle coating in comparison with the untreated test piece. On the one hand, the biofilm inhibition rate by single ε-PL and silver nano particle coating was decreased by a washing condition, in other words, a biofilm adhesion inhibition property was decreased. The reason is presumed that the drug in the coating layer was easily washed out by water washing. In addition, when an adhesion amount of silver nano particle coating was larger, a biofilm adhesion amount tended to be larger. The reason is presumed that an inactivate component derived from the product became a scaffold to accelerate a biofilm and a colonization of a bacterial cell. On the one hand, even when water washing was additionally performed, a biofilm inhibition effect of the GPE-ized polycarboxylic acid/ε-PL coating was maintained. Thus, a sustained effect of the GPE-ized polycarboxylic acid/ε-PL coating was recognized. Such an effect was not achieved by single ε-PL and silver nano particle.

TABLE 2

| | Coating agent | Adhesion amount (μg/cm$^2$) | Biofilm inhibition rate (%) |
|---|---|---|---|
| Example 12 | GPE-ized γ-PGA(25)/ε-PL | 0.01 | 10 |
| Example 13 | ↑ | 0.02 | 50 |
| Example 14 | ↑ | 0.04 | 80 |
| Example 15 | ↑ | 0.08 | 85 |
| Example 16 | ↑ | 0.12 | 85 |
| Example 17 | GPE-ized PAC(19)/ε-PL | 0.01 | 15 |
| Example 18 | ↑ | 0.02 | 55 |
| Example 19 | ↑ | 0.04 | 77 |
| Example 20 | ↑ | 0.08 | 79 |
| Example 21 | ↑ | 0.12 | 80 |
| Example 22 | GPE-ized ALG(22)/ε-PL | 0.01 | 33 |
| Example 23 | ↑ | 0.02 | 60 |
| Example 24 | ↑ | 0.04 | 73 |
| Example 25 | ↑ | 0.08 | 75 |
| Example 26 | ↑ | 0.12 | 74 |

TABLE 2-continued

| | Coating agent | Adhesion amount (μg/cm$^2$) | Biofilm inhibition rate (%) |
|---|---|---|---|
| Comparative example 7 | ε-PL | 0.01 | 5 |
| Comparative example 8 | ↑ | 0.02 | 29 |
| Comparative example 9 | ↑ | 0.04 | 45 |
| Comparative example 10 | ↑ | 0.08 | 52 |
| Comparative example 11 | ↑ | 0.12 | 57 |
| Comparative example 12 | Siver nano particle | 0.01 | 30 |
| Comparative example 13 | ↑ | 0.02 | 45 |
| Comparative example 14 | ↑ | 0.04 | 67 |
| Comparative example 15 | ↑ | 0.08 | 48 |
| Comparative example 16 | ↑ | 0.12 | 18 |
| Comparative example 17 | IPMP ethanol | 0.01 | 41 |
| Comparative example 18 | ↑ | 0.02 | 48 |
| Comparative example 19 | ↑ | 0.04 | 57 |
| Comparative example 20 | ↑ | 0.08 | 66 |
| Comparative example 21 | ↑ | 0.12 | 75 |

Test Example 3: Biofilm Removing Effect Test After Immersion in Drug

SCD broth containing the bacterial liquid of P. fluorescens having a concentration of 10$^6$ cfu/mL prepared in Test example 1 was added to 48-well microplate manufactured by Sumitomo Bakelite Co., Ltd. for cultivation at 30° C. for 1 week to form a biofilm in the plate. The bacterial liquid as supernatant was removed, and the residue was rinsed using a sterilized normal saline and dried. The test liquid was prepared by a similar method to Test example 2. Specifically, a fine particle suspension was prepared so that a concentration of GPE-ized polycarboxylic acid became 0.5 wt % and a concentration of ε-PL became 0.04 wt % in the suspension. In a microplate in which a biofilm was formed, 1 mL of each test liquid was added to immerse the biofilm for 1 minute, 10 minutes, 30 minutes or 60 minutes to evaluate a biofilm removing effect at every immersion (contact) time. The test drug was removed after a lapse of the immersion (contact) time, and the residue was immediately washed using 1 mL of normal saline two times and dried to measure a biofilm amount by CV staining method described in Test example 2. A biofilm removing rate was calculated by the following formula:

Biofilm removing rate (%)=(measurement value of untreatment−measurement value after immersion in test liquid)/(measurement value of untreatment)×100

A relation between the contact (immersion) time of each test drug with a biofilm and a biofilm removing rate is shown in Table 3 and FIG. 5. A biofilm removing property of ε-PL aqueous solution is the highest, and a biofilm removing property of GPE-ized polycarboxylic acid/ε-PL was 70% thereof. The biofilm removing property is similar to that of IPMP known as a biofilm sanitizer and higher than that of silver nanoparticle. The result demonstrated that a biofilm removing property of silver nanoparticle was decreased by prolonging the contact time. The reason is presumed that silver nanoparticle became aggregated due to an impurity such as a protein derived from a biofilm and a salt in the broth.

Test Example 4: Biofilm Inhibition Test After Immersion in (Contact with) Drug

In a microplate of Test example 3 in which a biofilm was formed, 1 mL of each test drug was added for an immersion for 1 minute, 10 minutes, 30 minutes or 60 minutes. The test drug was removed after the contact time, and the residue was washed using 1 mL of normal saline two times. In the microplate, 1 mL of SCD broth was added for a cultivation at 30° C. for 24 hours to form a biofilm again and to evaluate a re-inhibition property of a biofilm. An amount of a biofilm was measured after the cultivation. An amount of a biofilm was measured by CV staining method described in Test example 2. A biofilm inhibition rate was calculated by the following formula:

Biofilm inhibition rate (6)=(measurement value of untreatment−measurement value after immersion in test liquid)/(measurement value of untreatment)×100

A relation between each test drug and an inhibition rate is shown in Table 3 and FIG. 6. It was confirmed that a biofilm inhibition effect of PAC system as polycarboxylic acid among GPE-ized polycarboxylic acid/ε-PL is the highest. It was found that the GPE-ized polycarboxylic acid/ε-PL adhered on the surface of a biofilm and a biofilm inhibition effect of the GPE-ized polycarboxylic acid/ε-PL is maintained even in a broth environment in which a biofilm is easily formed.

inoculated to Petrifilm™ broth manufactured by 3M for a cultivation at 30° C. for 1 week. Then, the number of colonies was counted and the number of viable bacteria was measured. A relation between a contact time with the drug and the number of viable bacteria is shown in Table 4 and FIG. 7. The number of viable bacteria was 40000 cfu/well in the untreatment case; on the one hand, it was confirmed that the bacteria number in a biofilm was reduced by an immersion in the fine particle suspension in Examples 37 to 39 as the number of viable bacteria was reduced.

TABLE 4

| | Fine particles | Number of viable bacteria in biofilm every contact time (cfu/well) | | | |
|---|---|---|---|---|---|
| | | 1 min | 10 min | 30 min | 60 min |
| Example 30 | GPE-ized γ-PGA(25)/ε-PL | 5500 | 2000 | 900 | 900 |
| Example 31 | GPE-ized PAC(19)/ε-PL | 1500 | 1200 | 1200 | 1200 |
| Example 32 | GPE-ized ALG(22)/ε-PL | 6600 | 1000 | 1400 | 1400 |
| Comparative example 25 | ε-PL | 1200 | 1200 | 1200 | 1200 |
| Comparative example 26 | Silver nano particle | 2400 | 2800 | 5200 | 8200 |
| Comparative example 27 | IPMP ethanol | 1900 | 800 | 800 | 800 |

INDUSTRIAL APPLICABILITY

The fine particle of the present invention has a wide range of applications, since a biofilm can be effectively prevented

TABLE 3

| | Fine particle | Removal rate of biofilm every contact time (Test example 3) | | | | Removal rate of biofilm every contact time (Test example 4) | | | |
|---|---|---|---|---|---|---|---|---|---|
| | | 1 min | 10 min | 30 min | 60 min | 1 min | 10 min | 30 min | 60 min |
| Example 27 | GPE-ized γ-PGA(25)/ε-PL | 75 | 76 | 70 | 60 | 8 | 21 | 25 | 33 |
| Example 28 | GPE-ized PAC(19)/ε-PL | 68 | 68 | 69 | 59 | 31 | 71 | 73 | 74 |
| Example 29 | GPE-ized ALG (22)/ε-PL | 21 | 46 | 66 | 68 | 15 | 34 | 44 | 55 |
| Comparative example 22 | ε-PL | 87 | 87 | 84 | 83 | 22 | 38 | 40 | 45 |
| Comparative example 23 | Silver nano particle | 52 | 61 | 51 | 28 | 58 | 66 | 54 | 37 |
| Comparative example 24 | IPMP ethanol | 60 | 56 | 61 | 52 | 22 | 33 | 37 | 57 |

Test Example 5: Biofilm Bactericidal Property Test

After the test drug was contacted with a biofilm, a bactericidal property against the bacterium in the biofilm was tested. In a microplate of Test example 3 in which a biofilm was formed, 1 mL of each test drug was added for an immersion for 1 minute, 10 minutes, 30 minutes and 60 minutes. The test drug was removed after the lapse of contact time, and the reside was immediately washed using 1 mL of normal saline two times. In the microplate, 1 mL of normal saline was added. The bacterium was eluted in the normal saline by treating the mixture for 1 minute using an ultrasound bath to destroy the biofilm. The eluate was diluted from $10^2$ to $10^8$ using sterilized normal saline, and from being formed or removed by coating a material or immersing a material in a suspension prepared by dispersing the fine particle. In addition, since the fine particle is composed of a highly safe material and has an adhesive performance to a base material, the fine particle can be used as a countermeasure against a biofilm.

The invention claimed is:
1. A particle comprising a complex consisting of a polycarboxylic acid derivative and a drug,
wherein the polycarboxylic acid derivative is a compound produced by condensing a polycarboxylic acid and a propargyl amino acid represented by the following formula (1):

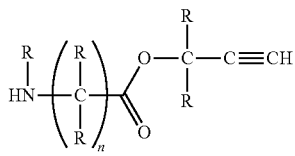
(1)

wherein

R is a hydrogen atom or a $C_{1-8}$ hydrocarbon group, a plurality of hydrogen atoms in the hydrocarbon group may be substituted by a nitrogen atom, an oxygen atom, or a sulfur atom, and n is an integer between 1 and 3, inclusive, and wherein the particle is water-dispersible.

2. The particle according to claim 1, wherein the particle is an aggregate of the complex.

3. The particle according to claim 1, wherein the drug comprises an antimicrobial peptide.

4. The particle according to claim 1, wherein the drug comprises ε-poly-L-lysine.

5. The particle according to claim 1, wherein the polycarboxylic acid is one or more selected from the group consisting of polyglutamic acid, polyacrylic acid, alginic acid and salts thereof.

6. The particle according to claim 1, wherein an average particle size is between 0.05 μm and 0.7 μm, inclusive.

7. The fine particle according to claim 1, wherein a molar ratio of the drug to the propargyl amino group of the polycarboxylic acid derivative is between 0.1 and 0.75, inclusive.

8. An antimicrobial agent and/or a biofilm remover comprising the particle according to claim 1.

9. An antimicrobial agent and/or a biofilm remover comprising the particle according to claim 4.

* * * * *